(No Model.)
H. DOOLITTLE.
Harrow.
No. 242,612. Patented June 7, 1881.
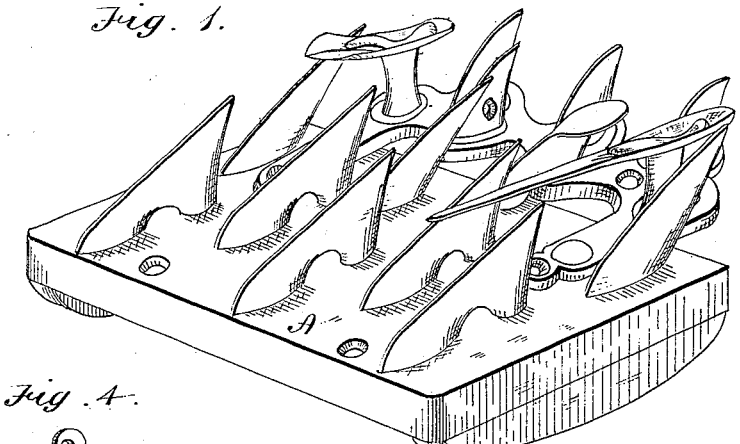
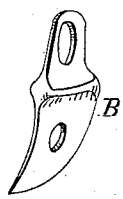
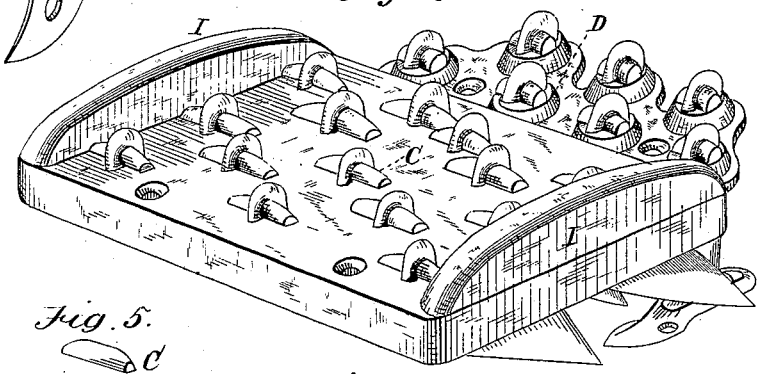
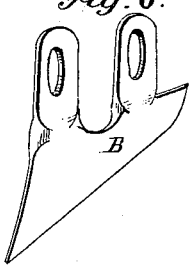
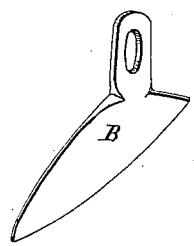
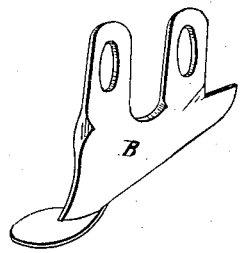
Attest,
W. H. H. Knight
W. C. Johnston
Inventor,
Harrison Doolittle.
By H. T. Abbot
Attorney
N. PETERS, Photo-Lithographer, Washington, D. C.

UNITED STATES PATENT OFFICE.

HARRISON DOOLITTLE, OF PLAIN CITY, OHIO.

HARROW.

SPECIFICATION forming part of Letters Patent No. 242,612, dated June 7, 1881.

Application filed November 9, 1880. (No model.)

*To all whom it may concern:*

Be it known that I, HARRISON DOOLITTLE, a citizen of the United States, residing at Plain City, in the county of Madison and State of Ohio, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a perspective of the cultivator and harrow resting upon its runners; Fig. 2, a perspective of it in reversed position; Fig. 3, a cross-section through one of the flanged sockets formed in a casting for the shanks of the teeth. Fig. 4 is a perspective of one of the teeth; Fig. 5, a perspective of a shank adapted to have different forms of teeth attached thereto, also exhibiting a web-tooth detached therefrom, a pin for holding the two together, and a pin for holding the shank to the frame. Figs. 6, 7, and 8 illustrate different forms of teeth used in the harrow, and Fig. 9 a perspective of a tooth adapted to dig potatoes.

My invention relates to harrows; and it consists in the construction, and also the combination of parts, hereinafter described, and then sought to be specifically defined by the claim.

In the accompanying drawings, the letter A indicates the harrow-frame, provided with a series of teeth. The teeth B are made with receding cutting-edges, as illustrated, and are adjusted to their places by passing their shanks through holes made in the frame, and are securely held in place by pins inserted into eyes made in the shanks of the teeth. The teeth may have one or more shanks, as described, and are detachable from the frame by slipping out the pins C and withdrawing the shanks from the frame, and after they have been sharpened they can be readily reinstated. The points are arranged with reference to each other so that each succeeding row will be in line with the spaces between the preceding row, whereby the clods will be progressively cut into smaller pieces as the harrow is advanced.

To the back of the frame there is bolted a casting, D, which is provided with a series of flanged sockets, E, for the shanks of the points. These flanges strengthen the sockets and permit the casting to be made lighter than it otherwise would be with the same strength to the sockets. The casting can be readily detached from the frame, and as the teeth thereon are arranged the same as those on the frame the size into which the clods are to be cut can be controlled by using the casting with the frame or dispensing with it altogether, thereby rendering the frame lighter; or the same end can be reached by dispensing with one or more rows of the teeth by detaching them, as already described.

Both the web and the bill teeth are made with sockets, and their shanks H are made each with a heel, *a*, and a toe, *b*, to fit into the socket and under the tooth, and a wedge, *c*, fits between the heel and the tooth, so as to hold the two together.

By the construction described either a web or a bill tooth can be used, as desired, and when one is worn out another can be substituted for it. The other teeth and their shanks can be constructed so as to be connected together in the same way.

In order to facilitate taking the harrow from the field, it is provided with runners I, placed at either end on the reverse side from the teeth, so that the frame can be inverted—the teeth up and the runners down—and the harrow drawn off without further breaking the soil, and can be slid with comparative ease from one point to another.

The harrow is cheap of manufacture, effective in operation for the several purposes intended, can be easily transformed to suit the wishes of the farmer, and the teeth quickly removed for sharpening and then reinstated.

Having described my invention, what I claim is—

In a harrow, the combination, with the frame, of the detachable casting D, provided with flanged sockets E, arranged in successive rows, the sockets of one row being in line with the spaces between the sockets of the preceding rows, as and for the purposes set forth.

In testimony whereof I affix my signature in presence of two witnesses.

HARRISON DOOLITTLE.

Witnesses:
E. C. ROBINSON,
M. W. HORN.